(12) United States Patent
Craighead et al.

(10) Patent No.: US 7,537,807 B2
(45) Date of Patent: May 26, 2009

(54) SCANNED SOURCE ORIENTED NANOFIBER FORMATION

(75) Inventors: Harold G. Craighead, Ithaca, NY (US); Jun Kameoka, College Station, TX (US)

(73) Assignee: Cornell University, Ithaca, NY (US)

( * ) Notice: Subject to any disclaimer, the term of this patent is extended or adjusted under 35 U.S.C. 154(b) by 730 days.

(21) Appl. No.: 10/951,254

(22) Filed: Sep. 27, 2004

(65) Prior Publication Data

US 2005/0123688 A1 Jun. 9, 2005

Related U.S. Application Data

(60) Provisional application No. 60/506,214, filed on Sep. 26, 2003.

(51) Int. Cl.
*B05D 1/04* (2006.01)
(52) U.S. Cl. .................................................... 427/458
(58) Field of Classification Search ........................ None
See application file for complete search history.

(56) References Cited

U.S. PATENT DOCUMENTS

| | | | |
|---|---|---|---|
| 3,994,258 A * | 11/1976 | Simm ........................ 118/626 |
| 4,127,706 A | 11/1978 | Martin et al. |
| 4,443,319 A | 4/1984 | Chait et al. |
| 4,483,885 A | 11/1984 | Chait et al. |
| 4,963,736 A | 10/1990 | Douglas et al. |
| 5,296,114 A | 3/1994 | Manz |
| RE34,757 E | 10/1994 | Smith et al. |
| 5,358,618 A | 10/1994 | Ewing et al. |
| 5,393,975 A | 2/1995 | Hail et al. |
| 5,423,964 A | 6/1995 | Smith et al. |
| 5,599,432 A | 2/1997 | Manz et al. |
| 5,624,539 A | 4/1997 | Ewing et al. |
| 5,672,399 A | 9/1997 | Kahlbaugh et al. |
| 5,705,813 A | 1/1998 | Apffel et al. |
| 5,716,825 A | 2/1998 | Hancock et al. |
| 5,800,690 A | 9/1998 | Chow et al. |
| 5,833,861 A | 11/1998 | Afeyan et al. |
| 5,856,671 A | 1/1999 | Henion et al. |
| 5,858,188 A | 1/1999 | Soane et al. |

(Continued)

FOREIGN PATENT DOCUMENTS

EP 0653631 B1 5/1995

(Continued)

OTHER PUBLICATIONS

Kameoka et al, Nanotechnology, 14, Pub. Sep. 5, 2003, pp. 1124-1129.*

(Continued)

*Primary Examiner*—Frederick J Parker
(74) *Attorney, Agent, or Firm*—Schwegman, Lundberg & Woessner, P.A.

(57) ABSTRACT

Nanofibers are formed using electrospray deposition from microfluidic source. The source is brought close to a surface, and scanned in one embodiment to form oriented or patterned fibers. In one embodiment, the surface has features, such as trenches on a silicon wafer. In further embodiments, the surface is rotated to form patterned nanofibers, such as polymer nanofibers. The nanofibers may be used as a mask to create features, and as a sacrificial layer to create nanochannels.

18 Claims, 9 Drawing Sheets

U.S. PATENT DOCUMENTS

| | | |
|---|---|---|
| 5,858,195 A | 1/1999 | Ramsey |
| 5,866,345 A | 2/1999 | Wilding et al. |
| 5,872,010 A | 2/1999 | Karger et al. |
| 5,885,470 A | 3/1999 | Parce et al. |
| 5,917,184 A | 6/1999 | Carson et al. |
| 5,935,401 A | 8/1999 | Amigo |
| 5,958,202 A | 9/1999 | Regnier et al. |
| 5,965,001 A | 10/1999 | Chow et al. |
| 5,969,353 A | 10/1999 | Hsieh |
| 5,993,633 A | 11/1999 | Smith et al. |
| 5,994,696 A | 11/1999 | Tai et al. |
| 6,001,229 A | 12/1999 | Ramsey |
| 6,010,607 A | 1/2000 | Ramsey |
| 6,010,608 A | 1/2000 | Ramsey |
| 6,012,902 A | 1/2000 | Parce |
| 6,033,546 A | 3/2000 | Ramsey |
| 6,033,628 A | 3/2000 | Kaltenbach et al. |
| 6,054,034 A | 4/2000 | Soane et al. |
| 6,056,860 A | 5/2000 | Amigo et al. |
| 6,068,749 A | 5/2000 | Karger et al. |
| 6,086,243 A | 7/2000 | Paul et al. |
| 6,110,343 A | 8/2000 | Ramsey et al. |
| 6,123,798 A | 9/2000 | Gandhi et al. |
| 6,139,734 A | 10/2000 | Settlage et al. |
| 6,149,870 A | 11/2000 | Parce et al. |
| 6,156,181 A | 12/2000 | Parce et al. |
| 6,159,739 A | 12/2000 | Weigl et al. |
| 6,176,962 B1 | 1/2001 | Soane et al. |
| 6,187,190 B1 | 2/2001 | Smith et al. |
| 6,231,737 B1 | 5/2001 | Ramsey et al. |
| 6,238,538 B1 | 5/2001 | Parce et al. |
| 6,240,790 B1 | 6/2001 | Swedberg et al. |
| 6,245,227 B1 | 6/2001 | Moon et al. |
| 6,277,641 B1 | 8/2001 | Yager |
| 6,280,589 B1 | 8/2001 | Manz et al. |
| 6,284,113 B1 | 9/2001 | Bjornson et al. |
| 6,284,115 B1 | 9/2001 | Apffel |
| 6,318,970 B1 | 11/2001 | Backhouse |
| 6,322,682 B1 | 11/2001 | Arvidsson et al. |
| 6,337,740 B1 | 1/2002 | Parce |
| 6,342,142 B1 | 1/2002 | Ramsey |
| 6,368,562 B1 | 4/2002 | Yao |
| 6,375,817 B1 | 4/2002 | Taylor et al. |
| 6,394,942 B2 | 5/2002 | Moon et al. |
| 6,409,900 B1 | 6/2002 | Parce et al. |
| 6,413,401 B1 | 7/2002 | Chow et al. |
| 6,416,642 B1 | 7/2002 | Alajoki et al. |
| 6,417,510 B2 | 7/2002 | Moon et al. |
| 6,423,198 B1 | 7/2002 | Manz et al. |
| 6,432,311 B2 | 8/2002 | Moon et al. |
| 6,444,461 B1 | 9/2002 | Knapp et al. |
| 6,450,047 B2 | 9/2002 | Swedberg et al. |
| 6,450,189 B1 | 9/2002 | Ganan-Calvo |
| 6,454,924 B2 | 9/2002 | Jedrzejewski et al. |
| 6,454,938 B2 | 9/2002 | Moon et al. |
| 6,459,080 B1 | 10/2002 | Yin et al. |
| 6,461,516 B2 | 10/2002 | Moon et al. |
| 6,462,337 B1 | 10/2002 | Li et al. |
| 6,464,866 B2 | 10/2002 | Moon et al. |
| 6,465,776 B1 | 10/2002 | Moini et al. |
| 6,475,363 B1 | 11/2002 | Ramsey |
| 6,475,441 B1 | 11/2002 | Parce et al. |
| 6,481,648 B1 | 11/2002 | Zimmermann |
| 6,491,804 B2 | 12/2002 | Manz et al. |
| 6,495,016 B1 | 12/2002 | Nawracala |
| 6,500,323 B1 | 12/2002 | Chow et al. |
| 6,514,399 B1 | 2/2003 | Parce et al. |
| 6,517,234 B1 | 2/2003 | Kopf-Sill et al. |
| 6,524,456 B1 | 2/2003 | Ramsey et al. |
| 6,541,768 B2 | 4/2003 | Andrien, Jr. et al. |
| 6,555,067 B1 | 4/2003 | Gandhi et al. |
| 6,569,324 B1 | 5/2003 | Moon et al. |
| 6,576,896 B2 | 6/2003 | Figeys et al. |
| 6,596,988 B2 | 7/2003 | Corso et al. |
| 6,602,472 B1 | 8/2003 | Zimmermann et al. |
| 6,605,472 B1 | 8/2003 | Skinner et al. |
| 6,607,644 B1 | 8/2003 | Apffel, Jr. |
| 6,621,076 B1 | 9/2003 | Van de Goor et al. |
| 6,627,076 B2 | 9/2003 | Griffiths |
| 6,627,882 B2 | 9/2003 | Schultz et al. |
| 6,632,655 B1 | 10/2003 | Mehta et al. |
| 6,653,625 B2 | 11/2003 | Andersson et al. |
| 6,656,394 B2 | 12/2003 | Kelly |
| 6,681,788 B2 | 1/2004 | Parce et al. |
| 6,695,009 B2 | 2/2004 | Chien et al. |
| 6,709,559 B2 | 3/2004 | Sundberg et al. |
| 6,733,645 B1 | 5/2004 | Chow |
| 6,744,046 B2 | 6/2004 | Valaskovic et al. |
| 6,803,568 B2 | 10/2004 | Bousse et al. |
| 6,814,859 B2 | 11/2004 | Koehler et al. |
| 6,827,095 B2 | 12/2004 | O'Connor et al. |
| 6,991,702 B2 | 1/2006 | Kim |
| 7,105,810 B2 | 9/2006 | Kameoka et al. |
| 2001/0037979 A1 | 11/2001 | Moon et al. |
| 2002/0036140 A1 | 3/2002 | Manz et al. |
| 2002/0041827 A1 | 4/2002 | Yager et al. |
| 2002/0090725 A1* | 7/2002 | Simpson et al. ............. 435/402 |
| 2002/0100714 A1 | 8/2002 | Staats |
| 2002/0110902 A1 | 8/2002 | Prosser et al. |
| 2002/0117517 A1 | 8/2002 | Unger et al. |
| 2002/0121487 A1 | 9/2002 | Robotti et al. |
| 2002/0123153 A1 | 9/2002 | Moon et al. |
| 2002/0139931 A1 | 10/2002 | Yin et al. |
| 2002/0158195 A1 | 10/2002 | Andersson et al. |
| 2002/0170825 A1 | 11/2002 | Lee et al. |
| 2002/0182649 A1 | 12/2002 | Weinberger et al. |
| 2003/0000835 A1 | 1/2003 | Witt et al. |
| 2003/0017609 A1 | 1/2003 | Yin et al. |
| 2003/0026740 A1 | 2/2003 | Staats |
| 2003/0029724 A1 | 2/2003 | Derand et al. |
| 2003/0047680 A1 | 3/2003 | Figeys et al. |
| 2003/0066959 A1 | 4/2003 | Andersson et al. |
| 2003/0073260 A1 | 4/2003 | Corso |
| 2003/0082080 A1 | 5/2003 | Zimmermann et al. |
| 2003/0089605 A1 | 5/2003 | Timperman |
| 2003/0089606 A1 | 5/2003 | Parce et al. |
| 2003/0106294 A1* | 6/2003 | Chung et al. .................. 55/486 |
| 2003/0106799 A1 | 6/2003 | Covington et al. |
| 2003/0111599 A1 | 6/2003 | Staats |
| 2003/0146757 A1 | 8/2003 | Aguero et al. |
| 2003/0148922 A1 | 8/2003 | Knapp et al. |
| 2003/0153007 A1 | 8/2003 | Chen et al. |
| 2003/0180965 A1 | 9/2003 | Yobas et al. |
| 2003/0195611 A1* | 10/2003 | Greenhalgh et al. ........ 623/1.15 |
| 2003/0213918 A1 | 11/2003 | Kameoka et al. |
| 2003/0215855 A1 | 11/2003 | Dubrow et al. |
| 2004/0053333 A1 | 3/2004 | Hitt et al. |
| 2004/0075050 A1 | 4/2004 | Rossier et al. |
| 2004/0096960 A1 | 5/2004 | Burd Mehta et al. |
| 2004/0159783 A1 | 8/2004 | Gavin et al. |
| 2006/0068668 A1 | 3/2006 | Kameoka et al. |

FOREIGN PATENT DOCUMENTS

| | | |
|---|---|---|
| GB | 2379554 A | 3/2003 |
| WO | WO-91/11015 A1 | 7/1991 |
| WO | WO-96/04547 A1 | 2/1996 |
| WO | WO-96/36425 A1 | 11/1996 |
| WO | WO-00/41214 A1 | 7/2000 |
| WO | WO-00/62039 A1 | 10/2000 |
| WO | WO-02/30486 A2 | 4/2002 |
| WO | WO-02/45865 A1 | 6/2002 |
| WO | WO-02/47913 A1 | 6/2002 |
| WO | WO-02/055990 A2 | 7/2002 |

| WO | WO-02/080222 A1 | 10/2002 |
| --- | --- | --- |
| WO | WO-03/004160 A1 | 1/2003 |
| WO | WO-03/019172 A2 | 3/2003 |
| WO | WO-03/054488 A1 | 7/2003 |
| WO | WO-2004/044574 A1 | 5/2004 |
| WO | WO-2004/051697 A2 | 6/2004 |
| WO | WO-2004/062801 A1 | 7/2004 |
| WO | WO-2004/067162 A2 | 8/2004 |
| WO | WO-2004/070051 A2 | 8/2004 |

OTHER PUBLICATIONS

Kameoka, J., et al., "Polymeric Trapezoidal Microelectrospray Emitter Integrated with a Microfluidic Chip", *The Institute of Electrical Engineers & 2nd Annual International IEEE-EMBS Special Topic Conference on Microtechnologies in Biology and Medicine*, (May 2-4, 2002), 62-65.

"Advanced BioAnalytical Services, Inc. Gains Patent Rights to Novel Microfluidic Handling System", http://www.advion.com/neulicensepress1.html (Archived Apr. 10, 2001), 2 pgs.

"Applied Biosystems, Northeastern University and Professor Barry L. Karger, Ph.D. Form Collaboration to Research Advances in Separation Technology for Proteomics", http://www.applera.com/press/prccorp111901a.html (Archived Jun. 21, 2002), 3 pgs.

"Automated Nanospray", http://www.advion.com/advion_aufiles/AutomatedNanospray/sld001.htm (Archived Jun. 16, 2002), 13 Pages.

"Coming Soon . . . The Advion NanoMate™ 100", http://www.advion.com/ (Archived Apr. 5, 2001), 6 pgs.

"Disposable Nano-Electrospays", http://www.diagnoswiss.com/products/disp_nano_electr.html (Archived Jun. 5, 2002) 2 pgs.

Auriola, Seppo, et al., "Enhancement of sample loadings for the analysis of oligosaccharides isolated from *Pseudomonas aeruginosa* using transient isotachophoresis and capillary zone electrophoresis—electrospray—mass spectrometry", *Electrophoresis 1998, 19*, (1998), 2665-2676.

Balaguer, E., et al., "Comparison of Sheathless and Sheath Flow Electrospray Interfaces for On Line Capillary Electrophoresis Mass Spectrometry of Therapeutic Peptide Hormones", 1 page.

Banks, J. F., "Recent advances in capillary electrophoresis/electrospray/mass spectrometry", *Electrophoresis 1997, 18*, (1997), 2255-2266.

Banks, Jr., J. F., et al., "Detection of Fast Capillary Electrophoresis Peptide amnd Protein Separations Using Electrospray Ionization With a Time-of-Flight Mass Spectrometer", *Anal. Chem., 68*, (1996), 1480-1485.

Becker, Holger, et al., "Polymer Microfluidic Devices", *Talanta 56*, (2002), 267-287.

Bings, Nicolas H., et al., "Microfluidic Devices Connected to Fused-Silica Capillaries with Minimal Dead Volume", *Anal. Chem., 71*, (1999), 3292-3296.

Cao, Ping, et al., "Analysis of Peptides, Proteins, Protein Digests, and Whole Human Blood by Capillary Electrophoresis/Electrospray Ionization-Mass Spectrometry Using an In-capillary Electrode Sheathless Interface", *J. Am. Soc. Mass Spectrom 1998, 9*, (1998), 1081-1088.

Chan, Jason H., et al., "Microfabricated Polymer Devices for Automated Sample Delivery of Peptides for Analysis by Electrospray Ionization Tandem Mass Spectrometry", *Anal. Chem., 71*, (1999), 4437-4444.

Chang, Yan Z., et al., "Sheathless Capillary Electrophoresis/Electrospray Mass Spectrometry Using a Carbon-Coated Fused-Silica Capillary", *Anal. Chem., 72*, (2000), 626-630.

Chen, Shu-Hui, et al., "A Disposable poly(methylmethacrylate)-base microfluidic module for protein identification by nanoelectrospray ionization-tandem mass spectrometry", *Electrophoresis 2001, 22*, (2001), 3972-3977.

Chen, Yet-Ran, et al., "A Low-Flow CE/Electrospray Ionization MS Interface for Capillary Zone Electrophoresis Large-Volume Sample Stacking, and Micellar Electrokinetic Chromatography", *Anal. Chem., 75*, (2003), 503-508.

Chien, Ring-Ling, et al., "Sample Stacking of an Extremely Large Injection Volume in High-Performance Capillary Electrophiresis", *Anal. Chem., 64*, (1992), 1046-1050.

Chiou, Chi-Han, et al., "Micro devices integrated with microchannels and electrospray nozzles using PDMS casting techniques", *Sensors and Actuators B, 4311*, (2002), 1-7.

Deng, Yuzhong, et al., "Chip-Based Quantitative Capillary Electrophoresis/Mass Spectrometry Determination of Drugs in Human Plasma", *Anal. Chem., 73*, (2001), 1432-1439.

Ding, Jianmei, et al., "Advances in CE/MS—Recent developments in interfaces and applications", *Analytical Chemistry News & Features* (1999), 18 pgs.

Figeys, Daniel, et al., "A Microfabricated Device for Rapid Protein Identification by Microelectrospray Ion Trap Mass Spectrometry", *Anal. Chem., 69*, (1997), 3153-3160.

Figeys, Daniel, et al., "High Sensitivity Analysis of Proteins and Peptides by Capillary Electrophoresis-Tandem Mass Spectrometry: Recent Developments in Technology and Applications", *Electrophoresis, 19*, (1998), 885-892.

Figeys, Daniel, et al., "Protein identification by Solid Phase Microextraction-Capillary Zone Electrophoresis-Microelectrospray-Tandem mass Spectrometry", *Nature Biotechnology, 14*, (1996), 1579-1583.

Foret, Frantisek, et al., "Trace Analysis of Proteins by Capillary Zone Electrophoresis With On-Column Transient Isotachophoretic Preconcentration", *Electrophoresis, 14*, (1993), 417-428.

Geromanos, Scott, et al., "InJection adaptable Fine Ionization Source ('JaFIS') for Continuous Flow Nano-Electrospray", *Rapid Commun. Mass Spectrom., 12*, (1998), 551-556.

Geromanos, Scott, et al., "Tuning of an Electrospray Ionization Source for Maximum Peptide-Ion Transmission into a Mass Spectrometer", *Anal. Chem., 72*, (2000), 777-790.

Gobry, Veronique, et al., "Microfabricated Polymer Injector for Direct Mass Spectrometry Coupling", *Proteomics, 2*, (2002), 405-412.

Guo, Xu, et al., "Analysis of Metallothioneins by Means of Capillary Electrophoresis Coupled to Electrospray Mass Spectrometry with Sheathless Interfacing", *Rapid Commun. Mass Spectrom., 13*, (1999), 500-507.

Hayes, Roger N., et al., "[10] Collision-Induced Dissociation", *Methods of Enzymology, 193*, (1990), 237-263.

Issaq, Haleem J., et al., "SELDI-TOF MS for Diagnostic Proteomics", *Analytical Chemistry*, (2003), 149-155.

Janini, George M., et al., "A Sheathless Nanoflow Electrospray Interface for On-Line Capillary Electrophoresis Mass Spectrometry", *Anal. Chem., 75*, (2003), 1615-1619.

Johansson, I. M., et al., "Capillary Electrophoresis-Atmospheric Pressure Ionization mass Spectrometry for the Characterization of Peptides", *Journal of Chromatography, 554*, (1991), 311-327.

Kaiser, Thorsten, et al., "Capillary Electrophoresis Coupled to Mass Spectrometer for Automated and Robust Polypeptide Determination in Body Fluids for Clinical Use", *Electrophoresis, 25*, (2004), 2044-2055.

Kaiser, Thorsten, et al., "Capillary Electrophoresis Coupled to Mass Spectrometry to Establish Polypeptide Patterns in Dialysis Fluids", *Journal of Chromatography A, 1013*, (2003), 157-171.

Kameoka, Jun, et al., "A Polymeric Microfluidic Chip for CE/MS Determination of Small Molecules", *Anal. Chem., 73*, (2001), 1935-1941.

Kelly, John F., et al., "Capillary Zone Electrophoresis-Electrospray Mass Spectrometry at Submicroliter Flow Rates: Practical Considerations and Analytical Performance", *Anal. Chem., 69*, (1997), 51-60.

Kim, Jin-Sung, et al., "Microfabricated PDMS Multichannel Emmiter for Electrospray Ionization Mass Spectrometry", *J. Am. Soc. Mass Spectrom 2001, 12*, (2001), 463-469.

Kim, Jin-Sung, "Microfabrication of Polydimethylsiloxane electrospray ionization emitters", *Journal of Chromatography A, 924*, (2001), 137-145.

Kim, Jin-Sung, et al., "Miniaturized multichannel electrospray ionization emitters on poly(dimethylsiloxane) microfluidc devices", *Electrophoresis 2001, 22*, (2001), 3993-3999.

Kirby, Daniel P., et al., "A CE/ESI-MS Interface for Stable, Low-Flow Operation", *Anal. Chem., 68,* (1996),4451-4457.

Koutny, Lance B., et al., "Microchip Electrophoretic Immunoassay for Serum Cortisol", *Anal. Chem., 68,* (1996),18-22.

Larsson, Marita, "Transient isotachophoresis for sensitivity enhancement in capillary electrophoresis-mass spectrometry for peptide analysis", *Electrophoresis 2000, 21,* (2000),2859-2865.

Lazar, Iulia M., et al., "Subattomole-Sensitivity Microchip Nanoelectrospray Source with Time-of-Flight Mass Spectrometry Detection", *Anal. Chem., 71,* (1999),3627-3631.

Lee, Edgar D., et al., "On-Line Capillary Zone Electrophoresis-ion spray tandem mass spectrometry for the determination of Dynorphins", *Journal of Chromatography, 458,* (1998),313-321.

Li, Jianjun , et al., "Application of Microfluidic Devices to Proteomics Research", *Molecular & Cellular Proteomics 1.2,* (2002),157-168.

Li, Jianjun, et al., "Rapid and Sensitive seperation of trace level protein digest using microfabricated devices coupled to a quadrupole—time-of-light mass spectrometer", *Electrophoresis 2000, 21,* (2000),198-210.

Lin, Yuehe, et al., "Microfluidic Devices on Polymer Substrates for Bioanalytical Applications", 10 pages.

Moini, Mehdi, "Design and Performance of a Universal Sheathless Capillary Electrophoresis to Mass Spectrometry Interface USing a Split-Flow Technique", *Anal. Chem., 73,* (2001),3497-3501.

Neuhoff, Nils V., et al., "Mass spectrometry for the detection of differentially expressed proteins: a comparison of surface-enhanced laser desorption/ionization and capillary electrophoresis mass spectrometry", *Rapid Communications in Mass Spectrometry, 18,* (2004),149-156.

Neususs, Christian, et al., "A robust approach for the analysis fo peptides in the low femtomole range by capillary electrophoresis-tandem mass spectrometry", *Electrophoresis 2002, 23,* (2002),3149-3159.

Oleschuk, Richard D., et al., "Analytical microdevices for mass spectrometry", *trends in analytical chemistry,* vol. 19, No. 6, (2000),379-388.

Olivares, Jose A., et al., "On-Line Mass Spectrometric Detection for Capillary Zone Electrophoresis", *Anal. Chem., 59,* (1987), 1230-1232.

Paroni, Rita, et al., "Creatinine determination in serum by capillary electrophoresis", *Electrophoresis 2004, 25,* (2004),463-468.

Premstaller, Andreas , et al., "High-Performance Liquid Chromayography-Electrospray Ionization Mass Spectrometry Using Monolithic Capillary Columns for Proteomic Studies", *Anal. Chem., 73,* (2001),2390-2396.

Ramsey, R S., et al., "Generating Electrospray from Microchip Devices Using Electroosmotic Pumping", *Anal. Chem., 69,* (1997),1174-1178.

Rocklin, Roy D., et al., "A Microfabricated Fluidic Device for Performing Two-Dimensional Liquid-Phase Separations", *Anal. Chem., 72,* (2000),5244-5249.

Rohde, E , et al., "Comparison of protein mixtures in aqueous humor by membrane preconcentration—capillary electrophoresis—mass spectrometry", *Electrophpresis 1998, 19,* (1998),2361-2370.

Rohner, Tatiana C., et al., "Polymer Microspray with an Intergrated Thick-Film Microelectrode", *Anal. Chem., 73,* (2001),5353-5357.

Sanz-Nebot, Victoria, et al., "Capillary electrophoresis coupled to time of flight-mass spectrometry of therapeutic peptide hormones", *Electrophoresis 2003, 24,* (2003),883-891.

Schmitt-Kopplin, Philippe , et al., "Capillary electrophoresis—mass spectrometry: 15 years of developments and applications", *Electrophoresis 2003, 24,* (2003),3837-3867.

Schultz, Gary A., et al., "A Fully Intergrated Monolithic Microchip Electrospray Device for Mass Spectrometry", *Anal. Chem., 72,* (2000),4058-4063.

Selby, D. S., et al., "Direct Quantification of Alkaloid Mixtures by Electrospray Ionization Mass Spectrometry", *Journal of Mass Spectrometry, 33,* (1998),1232-1236.

Smith, Richard D., et al., "Capillary Zone Electrophoresis-Mass Spectrometry Using an Electrospray Ionization Interface", *Anal. Chem., 60,* (1988),436-441.

Smith, Richard D., et al., "New Developments in Biochemical Mass Spectrometry Electropray Ionization", *Anal. Chem., 62,* (1990),882-899.

Srinivasan, Thara, "ESI and/or CE on Microfluidic Chips: Literature Review", (2002),14 pages.

Stroink, Thom , et al., "On-line Coupling of Size Exclusion and Capillary Zone Electrophoresis via a Reversed-Phase C18 Trapping Column for the Analysis of Structurally Related Enkephalins in Cerebrospinal fluid", *Electrophoresis 2003, 24(5),* (2003),897-903.

Svedberg, Malin , "Sheathless Electrospray from Polymer Microchips", *Anal. Chem., 75,* (2003),3934-3940.

Tang, Ning, "Current Developments in SELDI Affinity Technology", *Mass Spectrometry Reviews, 23,* (2004),34-4.

Tang, Keqi, "Generation of Multiple Electrosprays Using Microfabricated Emitter Arrays for Improved Mass Spectrometric Sensitivity", *Anal. Chem., 73,* (2001),1658-1663.

Tempels, F.W. A., et al., "Chromatographic Preconcentration Coupled To Capillary Electrophoresis via an In-Line Injection Valve", *Anal. Chem., 76,* (2004),4432-4436.

Tomlinson, Andy J., et al., "Investigation of drug metabolism using capillary electrophoresis with photodiode array detection and on-line mass spectrometry equipped with an array detector", *Electrophoresis, 15,* (1994),62-71.

Tomlinson, Andy J., et al., "Systematic development of on-line membrane preconcentration-capillary electrophoresis-mass spectrometry for the analysis of peptide mixtures", *J. Cap. Elec., 002:5,* (1995),225-233.

Tomlinson, Andy J., et al., "Utility of Membrane Preconcentration-Capillary Electrophoresis-Mass Spectrometry in Overcoming Limited Sample Loading for Analysis of Biologically Derived Drug Metabolites, Peptides, and Proteins", *J. Am. Soc. Mass Spectrom, 8,* (1997),15-24.

Valaskovic, Gary A., et al., "Automated Orthogonal Control System for Electrospray Ionization Mass Spectrometry", *New Objective,* 1-5.

Villanueva, Josep , et al., "Serum Peptide Profiling by Magnetic Particle-Assisted, Automated Sample Processing and MALDI-TOF Mass Spectrometry", *Anal. Chem., 76,* (2004),1560-1570.

Von Brocke, Alexander, et al., "Recent advances in capillary electrophoresis/electrospray-mass spectrometry", *Electrophoresis, 22,* (2001),1251-1266.

Wang, Michael Z., et al., "Analysis of Human serum proteins by liquid phase isoelectric focusing and matrix-assisted laser desorption/ionization-mass spectrometry", *Proteomics, 3,* (2003),1661-1666.

Wen, Jenny, et al., "Microfabricated isoelectric focusing device for direct electrospray ionization-mass spectrometry", *Electrophoresis 2000, 21,* (2000),191-197.

Whitt, Jacob T., et al., "Capillary Electrophoresis to Mass Spectrometry Interface Using a Porous Junction", *Anal. Chem., 75,* (2003),2188-2191.

Wittke, Stefan, et al., "Determination of peptides and proteins in human urine with capillary electrophoresis-mass spectrometry, a suitable tool for the establishment fo new diagnostic markers", *Journal of Chromatography A, 1013,* (2003),173-181.

Wright, Jr., GL , et al., "Proteinchip® surface enhanced laser desorption/ionization (SELDI) mass spectrometry: a novel protein biochip technology for detection of prostate cancer biomakers in complex protein mixtures", *Prostate Cancer and Prostatic Diseases, 2,* (1999),264-276.

Zhang, B , et al., "Microfabricated Devices for Capillary Electrophoresis-Electrospray Mass Spectrometry", *Anal. Chem., 71,* (1999),3258-3264.

Zhu, Xiaofeng , et al., "A Colloidal Graphite-Coated Emitter for Sheathless Capillary Electrophoresis/Nanoelectrospray Ionization Mass Spectrometry", *Anal. Chem., 74,* (2002),5405-5409.

U.S. Appl. No. 10/394,757, filed Mar. 21, 2003, Electrospray Emitter for Microfluidic Channel.

Bings, Nicolas H., et al., "Microfluidic Devices Connected to Fused-Silica Capillaries with Minimal Dead Volume", *Anal. Chem., 71,* (1999),3292-3296..

Chan, Jason H., et al., "Microfabricated Polymer Devices for Automated Sample Delivery of Peptides for Analysis by Electrospray Ionization Tandem Mass Spectrometry", *Anal. Chem., 71*, (1999),4437-4444.

Czaplewski, David A., et al., "Nanofluidic Channels with Elliptical Cross Sections", *Applied Physics Letters, 83(23)*, (Dec. 8, 2003),4836-4838.

Czaplewski, David A., et al., "Nanomechanical Oscillators Fabricated Using Polymeric Nanofiber Templates", *Nano Letters, 4,* (2004),437-439.

Czaplewski, David A., et al., "Nonlithographic Approach to Nanostructure Fabrication Using a Scanned Electrospinning Source", *Journal of Vacuum Science & Technology B: Microelectronics and Nanometer Structures, 21(6)*, (Nov. 2003),2994-2997.

Figeys, Daniel , et al., "Nanoflow Solvent Gradient Delivery from a Microfabricated Device for Protein Identifications by Electropsray Ionization Mass Spectrometry", *Anal. Chem., 70,* (1998),3721-3727.

Jiang, Yun , et al., "Integrated Plastic Microfluidic Devices with ESI-MS for Drug Screening and residue Analysis", *Anal. Chem., 73,* (2001),2048-2053.

Kameoka, Jun , et al., "A Scanning Tip Electrospinning Source for Deposition of Oriented", *Nanotechnology, 14,* (2003),1124-1129.

Kameoka, Jun , et al., "An Arrow Shaped Silicon Tip for Polymeric Nanofiber Fabrication", *Journal of Photopolymer Science and Technology, 16,* (2003),423-426.

Kameoka, Jun , et al., "An Electrospray Ionization Source for Integration with Microfluidics", *Anal. Chem, 74,* (2002),5897-5901.

Kameoka, Jun , et al., "Fabrication of Oriented Polymeric Nanofibers on Planar Surfaces by Electrospinning", *Applied Physics Letters, 83(2),* (Jul. 14, 2003),371-373.

Kameoka, Jun , et al., "Polymeric Nanowire Architecture", *Journal of Materials Chemistry, 14,* (2004),1503-1505.

Koutny, Lance B., et al., "Microchip Electrophoretic Immunoassay for Serum Cortisol", *Anal. Chem., 68,* (1996),18-22.

Lazar, Iulia M., et al., "Subattomole-Sensitivity Microchip Nanoelectrospray Source with Time-of-Flight Mass Spectrometry Detection", *Anal. Chem., 71,* (1999),3627-3631.

Li, Jianjun , et al., "Separation and Identification of Peptides from Gel-Isolated Membrane Proteins Using a Microfabricated Device for Combined Capillary Electrophoresis/Nanoelectrospray Mass Spectrometry", *Anal. Chem., 72,* (2000),599-609.

Liu, Hanghui , et al., "Development of Multichannel Devices with an Array of Electrospray Tips for High-Throughput Mass Spectrometry", *Anal. Chem., 72,* (2000),3303-3310.

Liu, Haiqing , et al., "Polymeric Nanowire Chemical Sensor", *Nano Letters, 4,* (2004),671-675.

Ramsey, R. S., et al., "Generating Electrospray from Microchip Devices Using Electroosmotic Pumping", *Anal. Chem., 69,* (1997),1174-1178.

Rocklin, Roy D., et al., "A Microfabricated Fluidic Device for Performing Two-Dimensional Liquid-Phase Separations", *Anal. Chem., 72,* (2000),5244-5249.

Wachs, Timothy , et al., "Electrospray Device for Coupling Microscale Separations and Other Miniaturized Devices with Electrospray Mass Spectrometry", *Anal. Chem., 73,* (2001),632-638.

Xue, Qifeng , et al., "Multichannel Microchip Electrospray Mass Spectrometry", *Anal. Chem., 69,* (1997),426-430.

Yarin, A L., et al., "Taylor cone and jetting from liquid droplets in electrospinning of nanofibers", *Journal of Applied Physics, 90(9),* (Nov. 1, 2001),4836-4846.

Zhang, Bailin , et al., "A Microdevice with Integrated Liquid Junction for Facil Peptide and Protein Analysis by Capillary Electrophoresis/Electrospray Mass Spectrometry", *Anal. Chem., 72,* (2000),1015-1022.

"U.S. Appl. No. 11/262,550, Non-Final Office Action mailed Jun. 26, 2008", OARN,25 Pgs.

* cited by examiner

SCANNED SOURCE ORIENTED NANOFIBER FORMATION

RELATED APPLICATION

This application claims priority from U.S. Provisional Application No. 60/506,214; filed on Sep. 26, 2003; which is incorporated herein by reference.

This application is related to U.S. patent application Ser. No. 10/394,757 (entitled Electrospray Emitter for Microfluidic Channel, filed May 21, 2003).

GOVERNMENT FUNDING

The invention described herein was made with U.S. Government support under Grant Number ECS-9876771 awarded by National Science Foundation (NSF)/Nanobiotechnology Center (NBTC). The United States Government has certain rights in the invention.

FIELD OF THE INVENTION

The present invention relates to forming nanofibers, and in particular to forming oriented nanofibers using a scanned source.

BACKGROUND OF THE INVENTION

Nanoscale materials, such as nanowires, nanotubes and nanofibers have gained more attention recently because of their unique electrical, optical and mechanical properties. Fabrication of oriented nanofibers on a planar surface and integration of these nanofibers with microfabricated structures such as electrodes of surface topography are required for application to molecular electronics. Randomly oriented nanofibers with diameters in the range of 50 to 500 nm have been fabricated using electrospinning technology and suggested for use in a wide range of applications such as high performance filters, drug delivery, scaffolds for tissue engineering, optical and electronic applications.

Vertically oriented tubes or metal needles, connected to syringe pumps have normally been used as electrospinning sources. In these systems, a droplet of solution is formed at the exit of a tube with diameter in the range of 300 um to 1 mm. The exit of the capillary tubing is normally directed downward to a counter electrode. A Taylor cone is established at the exit of the capillary tube by applying an electric field. A polymeric solution is extracted from the Taylor cone and electrospun toward the counter electrode surface. The distance between the exit of the capillary tubing and the counter electrode is approximately 5-25 cm with an applied electric field of 1000 V/cm to 3000 V/cm.

Straight nanofibers with diameters ranging from 100 to 300 nm have been fabricated by electrospinning on an edge of a sharpened rotational disc collector for possible application to molecular electronics. However, this approach does not permit fabricating of nanofibers on a planar surface. Therefore, it is difficult if not impossible to integrate nanofibers with microfabricated structures for such applications.

SUMMARY OF THE INVENTION

Nanofibers are formed on a planar surface using electrospray deposition from a microfluidic source. The source is brought close to a surface, and scanned relative to the surface in one embodiment to form oriented or patterned fibers in desired positions. In one embodiment, the source is an electrospray source, such as a microfabricated tip provides a solution from an electrostatically formed Taylor cone formed on the tip.

In one embodiment, the surface has features, such as trenches on a silicon wafer. In further embodiments, the surface is rotated to form patterned nanofibers, such as polymer nanofibers.

In a further embodiment, polymeric nanofibers are formed by electrospinning a polymeric solution on a moving planar silicon surface with microstructures. The nanofibers are integrated with microfabricated structures.

The nanofibers may be used as etch masks for further processing, and may also be used to sacrificial layers to form rounded channels.

In still further embodiments, colloidal suspensions may be provided in the solution to form nanofibers containing nano spheres or other particles. The tips may be dipped in the solution, or fluidic channels may be coupled to the tips to provide the source for the nanofibers. Distances between source and surface, as well as solution viscosity may be varied to form nanofibers with differing properties.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
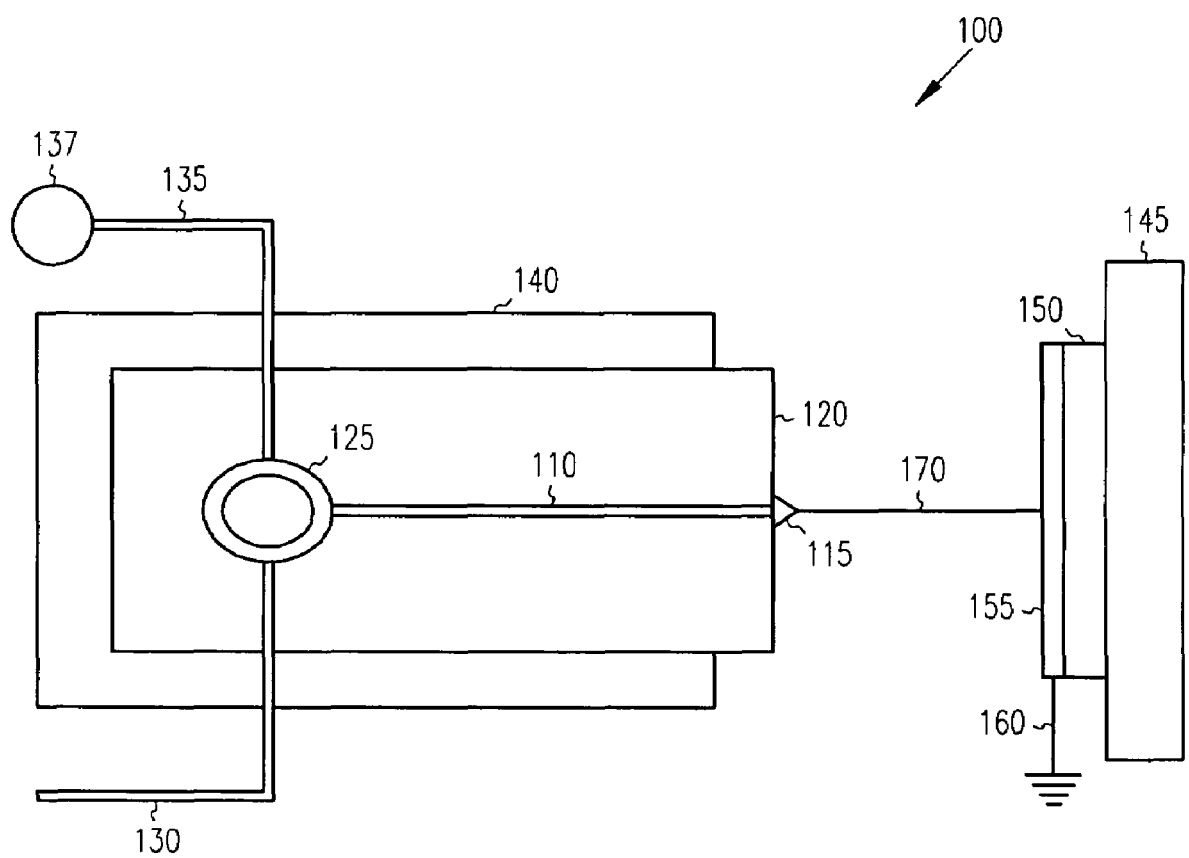
FIG. 1 is a block diagram of an electrospinning system for creating polymer nanofibers according to an example embodiment of the invention.

A microfluidic electrospray system is shown at 100 in FIG. 1. A microfluidic channel 110 is coupled at one end to a triangular tip 115, acting as a source for formation of nanofibers. Both are supported by a substrate 120. A reservoir 125 provides a polymer solution in one embodiment to the channel 110 and to the tip 115. Another end of the microfluidic channel 110 is coupled to a reservoir 125 formed in the substrate 120. The reservoir in one embodiment is coupled to a capillary tube 130, or other plumbing to provide the polymer solution to the reservoir and channel. A conductor, such as a gold wire 135 is coupled to the reservoir for coupling the reservoir to a power supply 137. The substrate is mounted on an x,y,z stage for moving the substrate laterally in a desired manner.

In one embodiment, the substrate 120 is positioned between approximately 5 mm to 12.5 mm from holder 145 on which a silicon substrate 150 with aluminum coating 155 is supported. The substrate and aluminum coating 155 are coupled to a ground via a conductor 160, forming a counter electrode. By applying a potential via power supply 137 with respect to the grounded substrate 150, a Taylor cone is established on tip 115, resulting in a liquid jet 170 being formed at the tip and moving toward the substrate 150. In one embodiment, the term Taylor cone is used to refer to any type of structure that result in a thin stream of liquid moving toward the substrate 150. By moving the substrate 120 by use of the x,y,z stage 140, the liquid jet moves across the substrate 150, creating nanofibers on the substrate.

The term "nanofibers" is meant to cover fibers within the dimensions described herein, and smaller fibers. Further the nanofibers may be larger than those described depending on multiple different parameters, including size of the triangle tip.

The microfluidic coupling allows new possibilities for materials processing and nanostructure formation. The source allows for smaller source to substrate distances and permits operation at lower voltages than conventional sources. The shorter distance, referred to as a deposition distance, enables greater control of nanofiber morphology and more localized deposition of the fibers. In one embodiment, nanofibers are formed within a 5 mm diameter circle on the substrate 150.

In one example, the electrospray device substrate 120 is attached on the x,y,z stage 140 and adjusted to form a deposition distance between the tip 115 and counter electrode/substrate of approximately 0.5 cm to 1.5 cm. A 300 nl/minute flow rate is created by coupling a syringe pump to the capillary tube 130. A potential is applied to the wire 135 of approximate 2000V to 8500V.

Approximately 500 nm of aluminum is optionally sputter-deposited on the silicon wafer and used as the counter electrode for nanofiber deposition. In one embodiment, the counter electrode is attached to a rotating optical chopper, with rotation rate varied between 40 RPM to 800 RPM. In a further embodiment, nanofibers are directly deposited on the silicon wafer without the need for the Al layer. In this embodiment, the silicon wafer acts as the counter electrode.

Figure 2:
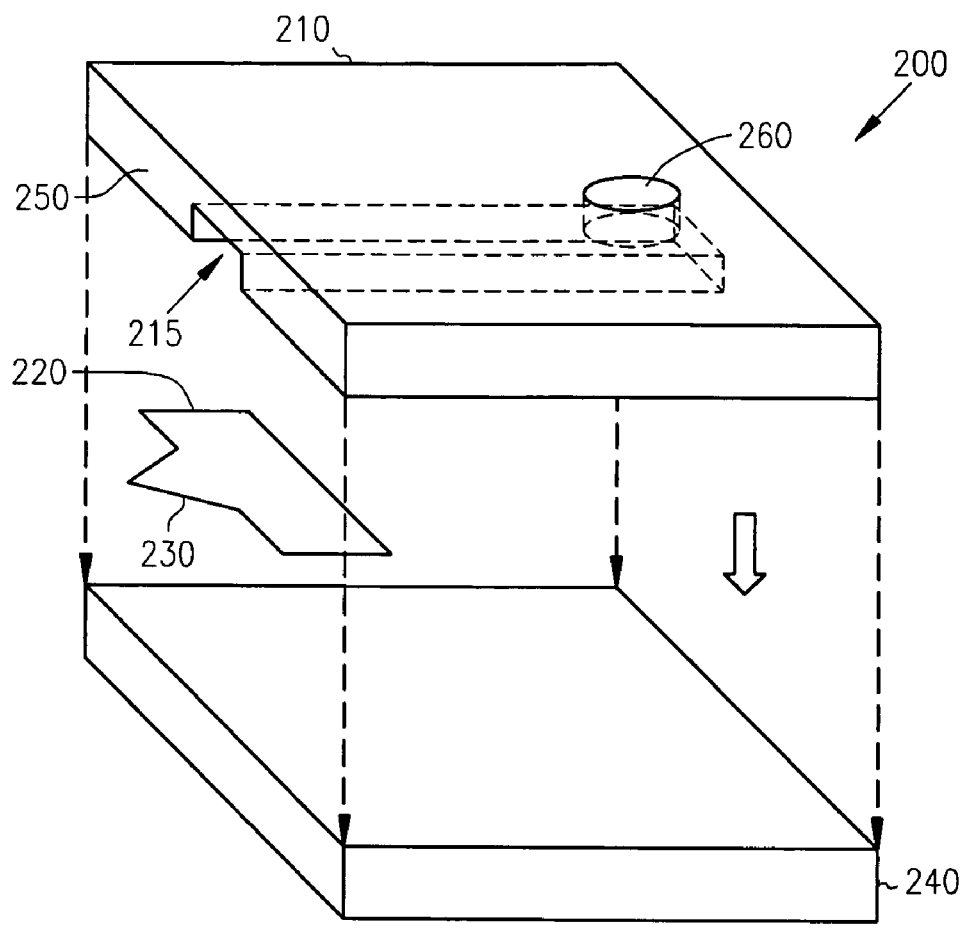
FIG. 2 is an exploded block view example of a channel with integrated electrospray emitter according to an embodiment of the invention.

Further detail of an electrospray device is shown at 200 in FIG. 2. In one embodiment, a top chip 210 has a microchannel 215 embossed therein. The device further comprises an emitter film 220, having a triangular or trapezoidal shaped tip 230. It should be noted that any type of source, such as commercially available electrospray sources may be used to provide an electrospray of desired materials in addition to the sources described herein. Electrospray techniques involve the use of an applied voltage to extract material from a surface.

In one embodiment, the emitter comprises a larger body portion that is rectangular, with the tip 230 extending from the rectangular portion. A bottom chip 240 is thermally bonded with the top chip 210, sandwiching a portion of the emitter film to hold it firmly between the chips. In one embodiment, the film covers a portion of the length of the channel at one end of the bonded chips as indicated at 250. The tip 230 extends laterally from the channel at end 250. A reservoir 260 is coupled to the other end of the channel 215.

The triangle tip 230 is approximately 3 um thick, and acts like a nozzle or wick that prevents liquid from spreading laterally at the exit of the fluidic channel. In one embodiment, the tip has an apex with an approximately 90 degree angle, and the angles adjacent the channel are approximately 45 degrees. The angle of the apex may be varied, such as between 40 and 120 degrees. At smaller apex angles, liquid may spread at the base of the triangle contacting the microchannel chip, as the wetting angle of solutions in the channel may be smaller than the angles the base of the triangle makes with the chip. Different apex angles may be optimal for solutions with different wetting angles. The base of the triangular tip is approximately 100 micrometers, and the height is approximately 50 micrometers. Thus, the base extends well beyond both sides of the channel when centered approximately at the center of the channel.

Figure 3:
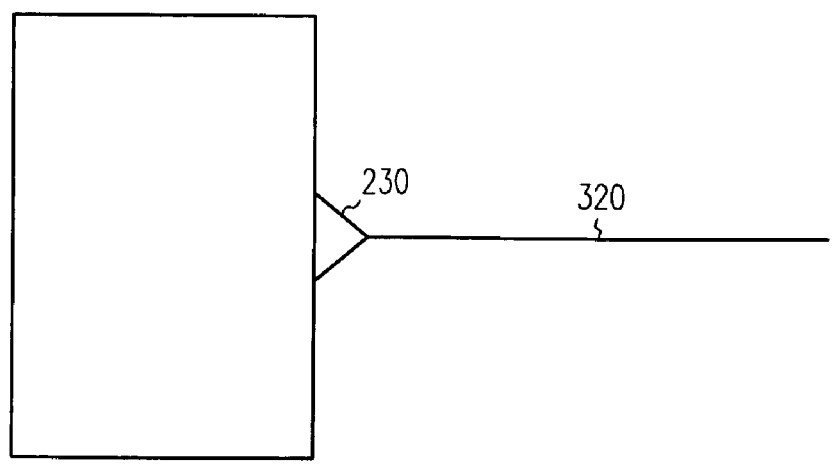
FIG. 3 is a representation of a Taylor cone established on a tip of an emitter in FIG. 2 according to an example embodiment of the invention.

The shape of the tip 230 helps form and fix a position of a Taylor cone, as shown in FIG. 3. When a difference in potential is applied to the device, a liquid droplet with a critical curvature for establishing a Taylor cone is formed at the apex of the triangle. A liquid jet 320 is formed at the apex. Highly charged small liquid droplets are made extending toward the counter electrode. Excess electrostatic force extracts liquid from the apex of the Taylor cone to establish the liquid jet. Other shapes of emitter film may also be used, such as trapezoidal shaped emitter films. While an electrospray emitter is described as the source for nanofibers, other sources may also be used to create oriented nanofibers.

Polyethylene oxide was used as the nanofiber solution in one embodiment. It was prepared by dissolving PEO monomer (MW 100,000) at weight concentration of 6% to 10% in a mixture of 50% deionized water and 50% ethanol. Other concentrations may also be used. PEO polymeric solution is electrosprayed to the rotational counter electrode. The deposition distance is set at 2 cm and the position of the triangular tip was set at 2.0 cm laterally away from the center of the counter electrode. Other solutions may also be used to form nanofibers.

For a spinning process, a flow rate of 300 nl/minute is maintained with the syringe pump. 7000V was applied to the gold wire at the fluid source with the metalized substrate at ground potential. A Taylor cone is maintained at the apex of the triangle tip with a stable total ion current of 15 nA.

In various embodiments, nanofiber size and morphology depend on process parameters, which may be varied significantly. Such parameters include the deposition distance, applied electric field strength, and rotational speed of the counter electrode. At smaller deposition distances, the polymer may arrive at the counter electrode as a solution, resulting in a structure resembling a membrane with holes, rather than fibers. In one embodiment, the deposition distance is set to 0.75 cm, and a Taylor cone is established with 3500V applied to the gold electrode. This resulted in approximately 14.8 nA of total ion current and columnar nanofibers with an average diameter of 200 nm. Nanofibers appear to have partially dried while traveling to the counter electrode.

With a distance of approximately 1.0 cm, a Taylor cone is established at about 4000V, and an ion current of about 14.5 nA. Thinner nanofibers are formed in this case, with an average diameter of approximately 100 nm. With a distance of 1.5 cm, the Taylor cone is also established at 4000V, resulting in columnar nanofibers with an average diameter of approximately 100 nm.

From the above examples, the nanofiber size decreased from 200 nm to 100 nm while the deposition distance was increased from 0.5 cm to 1.0 cm. Extension of the deposition distance to more than 1.0 cm did not influence the nanofiber diameter. Once the fibers form in transit, the nanofiber size appears to be fixed, and the fibers are deposited on the surface as a solid.

Applied electric field strength was varied from 4000 V/cm to 8500 V/cm at a distance of 1.0 cm. At 4000 V/cm, cylindrical nanofibers are formed with an average diameter of 100 nm. At 5500 V/cm, the diameter is almost the same, but branched nanofibers with small diameter of 30 to 60 run were fabricated between the main nanofibers. Nanospheres of approximately 200 to 400 nm were suspended between main nanofibers via smaller nanofibers. At 7000 V/cm, the diameter of the main nanofibers is about 120 nm. Small nanofibers between main nanofibers, as well as nanospheres increased further. At 8500 V/cm, the average diameter of the main nanofibers is about 150 nm. However, smaller, and a larger number nanofibers in the range of 10-20 nm formed. In addition, nanospheres with average diameter of 100 to 200 nm were suspended between medium size nanofibers via small nanofibers.

In still further embodiments, the substrate is rotated during fiber deposition. In various examples, the rotational speed of the counter electrode/substrate, was varied between 40 RPM and 800 RPM. The distance of the source was set approximately 2.0 cm from the center of the rotation of the electrode. At lower rotational speeds, nanofibers formed on the substrate tended to curve in a whiplike manner, creating loops and overlapping loops. As the speed is increased, the fibers formed tended to straighten out at approximately 600 RPM and higher, resulting in essentially straight or lateral fiber formation at nanoscales. The diameter of the nanofibers does not tend to be dependent on rotational speed at this distance.

Figure 4:
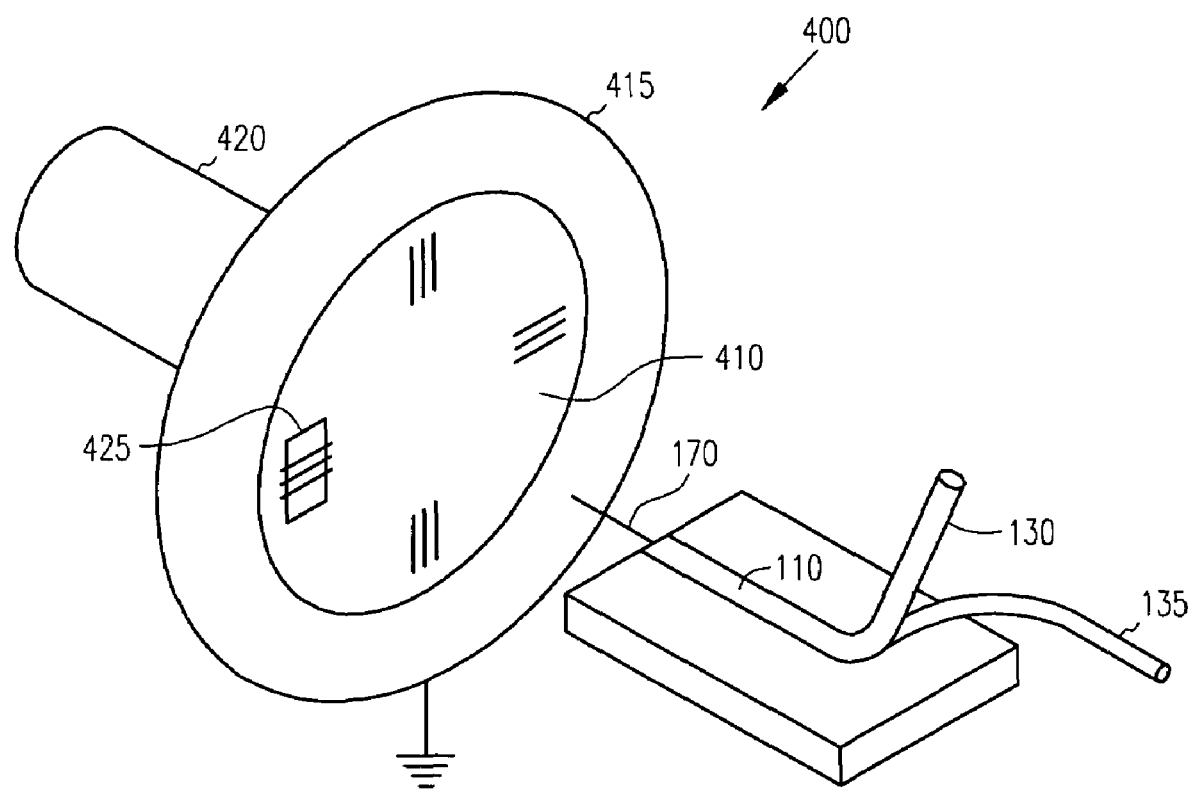
FIG. 4 is a block perspective view of an electrospinning system for creating polymer nanofibers on a spinning silicon substrate according to an example embodiment of the invention.

FIG. 4 is a block perspective view of an electrospinning system 400 for creating polymer nanofibers on a spinning silicon substrate according to an embodiment of the invention. As in FIG. 1, substrate 120 is mounted on a xyz translation stage, and provides a liquid jet 170 from the apex of a triangle sandwiched about a microchannel 110. A syringe pump provides a polymer to the microchannel via tube 130. Conductor 135 is used to apply a potential. The translation stage is used to position the apex of the triangle a desired distance from a target substrate 410 and counter electrode 415, such as deposited aluminum on the substrate. The substrate and counter electrode are mounted on motor 420, such as an optical chopper motor for rotating the substrate with respect to the triangle emitter.

Figure 5:
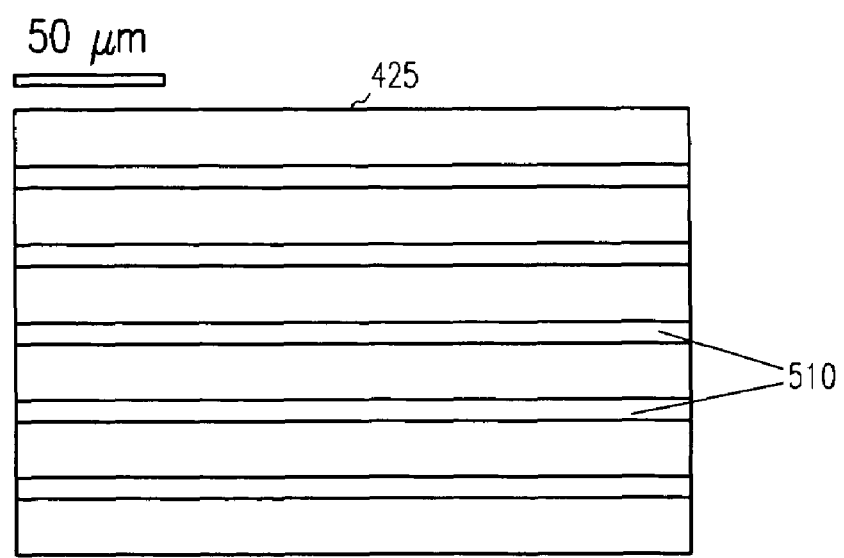
FIG. 5 is a planar view of the silicon substrate of FIG. 4 having features formed thereon.
Figure 6:
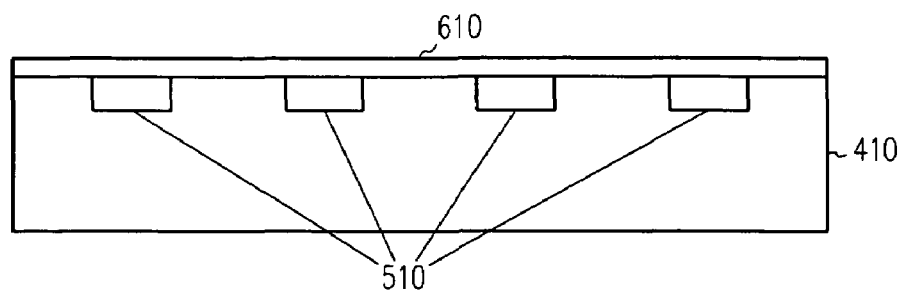
FIG. 6 is a cross section representation of an example nanofiber crossing multiple trenches.

The substrate, in one embodiment, has features 425 formed on its surface, one which nanofibers are to be formed. Such features are shown as trenches at 510 in FIG. 5, formed using common processing techniques. Many other structures may be formed as desired. In one embodiment, the trenches 510 are formed with an orientation such that nanofibers 610 will be formed transverse to them as shown in a cross section in FIG. 6. In FIG. 6, the trenches 510 are heading into the page, while the nanofibers, represented at 610 are formed along the surface of the substrate 410 substantially perpendicular to the trenches. In one embodiment, the nanofibers form an angle with respect to the trenches that may be varied as desired. The width of the trenches may be varied as desired such that the nanofibers span and dip into the trenches, or span the trenches in a substantially straight line.

In one embodiment, different width trenches were used, with widths of approximately 3 um and 5 um with a depth of 2 um. The silicon counter electrode was spun by the motor to create a linear velocity of the counter electrode relative to the microfabricated electrospinning source that is varied between 0.0 cm/s to 168 cm/s.

In one example, the linear velocities were varied with a fixed deposition distance of 2.0 cm with an applied potential of 4000V for 10 to 20 seconds. As the surface velocity increases, the effect of random motion becomes less significant and the orientation of the fibers is dominated by the linear driven motion. If a consistent surface velocity is desired, the rotations per minute must be decreased as the nanofibers are applied further from the center of rotation. In one embodiment, linear velocities were varied between 0.0 cm/s and 168 cm/s for a PEO nanofiber solution. Nanofibers are substantially straight at approximately 126 cm/s. They may be straight at lower speeds, and are likely straight at higher speeds. While the diameter of the nanofibers does not change appreciably with distance from the source, the speed at which straight nanofibers are formed may vary with other parameters, such as applied potential.

In further embodiments, the substrate is not spun, but is moved in a linear direction at a desired speed by a translator or other device. In still further embodiments, the source is moved, or a combination of moving both the source and substrate are used to obtain the desired relative motion.

Figure 7A:
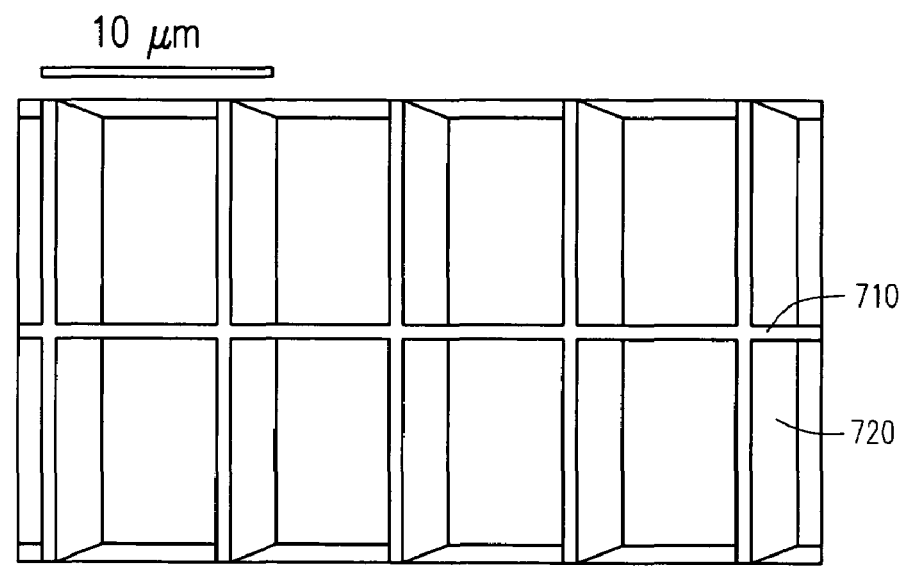
FIGS. 7A and 7B are block perspective representations of example nanofibers crossing different size trenches.
Figure 7B:
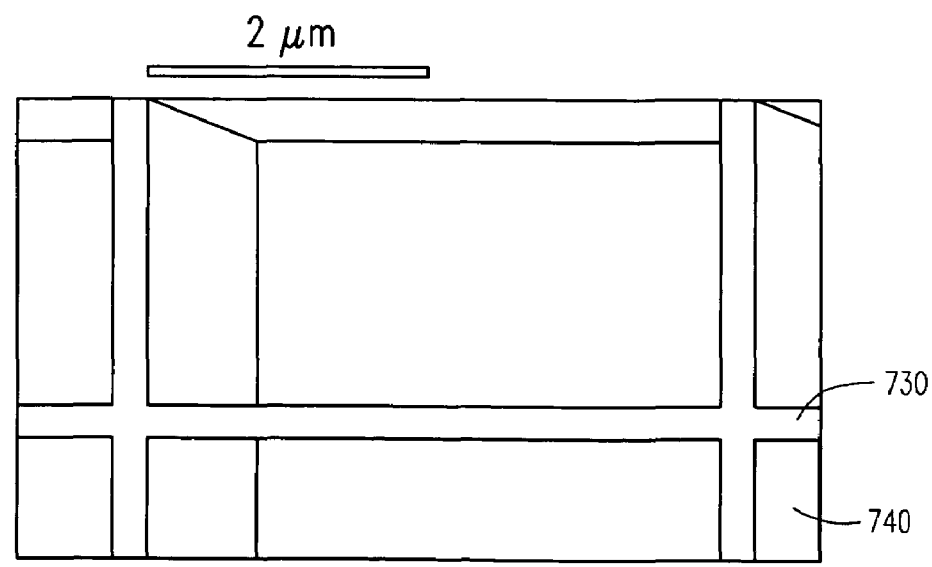

FIGS. 7A and 7B are block perspective representations of an oriented nanofiber 710 with a diameter of about 150 nm fabricated over multiple 3 um wide trenches such as trench 720, and an oriented nanofiber 730 with a diameter of about 140 nm fabricated over multiple 5 um wide trenches such as trench 740. The fibers are suspended between tops of the trenches, and span the gap between the trenches in one embodiment. While trenches are shown as features formed on or in the substrate, many other different features, including feature extending out from the substrate surface may be formed, and have nanofibers deposited across the trenches. The metal layer, such as aluminum may be removed following deposition of the nanofibers using suitable selective etching techniques.

Figure 8:
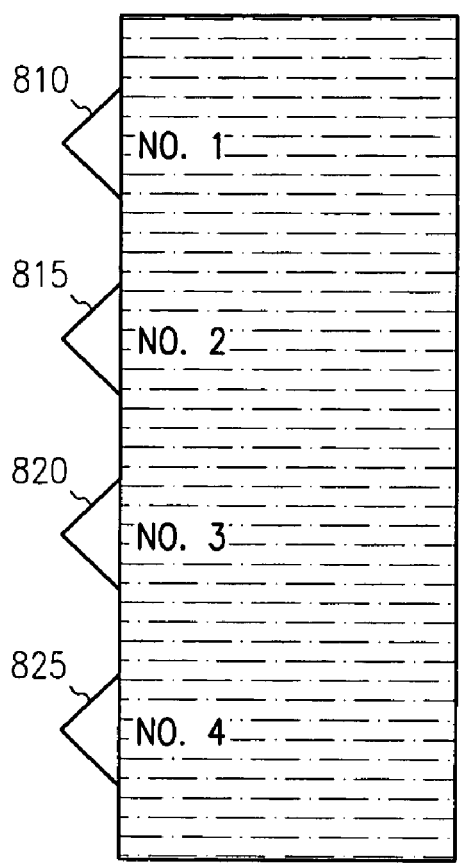
FIG. 8 is a block representation of an example multi-tip electrospray emitter device.

FIG. 8 is a block representation of a multi-tip electrospray emitter device. Four triangle emitters 810, 815, 820 and 825 are shown. Each emitter is coupled to a channel. They may be operated in parallel, or may be sequentially operated. When operated in parallel, the emitters are spaced sufficiently to minimize interference between the respective sprays. A multichannel system when operated in a multiplexed manner operates reliably with no significant cross contamination between the channels, forming substantially parallel sets of nanofibers.

Figure 9:
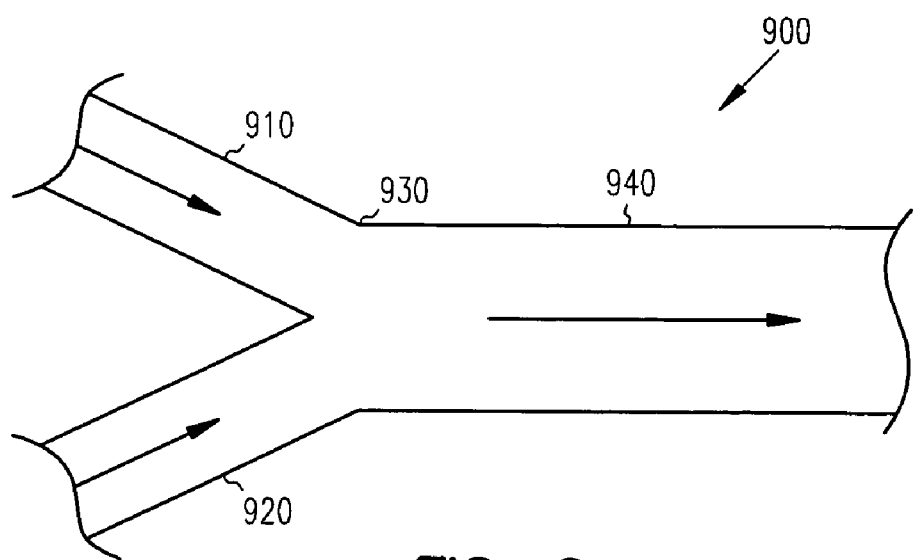
FIG. 9 is a block representation of an example "Y" shaped channel.

In one embodiment, a "Y" shaped channel indicated at 900 in FIG. 9 is used to provide nanofibers producing fluid to a source. Channel 900 is used in one embodiment to mix PEO solution and Rhodamine B. A first branch 910 provides the PEO solution, and a second branch 920 provides Rhodamine B. The materials come together at a junction of the branches at 930 and begin mixing. The mixed solution is guided to a source, such as a triangular tip as described above by channel 940 for electrospinning to fabricate nanofibers. Other materials may also be used, and more than two branches are used if needed.

In one embodiment, a laminar flow is created in the channel 940 prior to reaching the source. Laminar flow may be used to create layered nanofibers. Additional functions, such as valves and other functions may be added in the channel to further manipulate and control the flow of nanofibers source materials. Reactions may also be facilitated by the channel and associated structures that may be formed. The use of such channels also facilitates the creation of arrays of sources.

FIGS. 10A, 10B, 10C, 10D, 10E and 10F are block schematic diagrams illustrating formation of a tip according to an example embodiment. Conventional microfabrication approaches may be used to form an electrospinning tip source or sources that may be dipped in a solution from which nanowires or nanofibers may be formed.

Figure 10A:
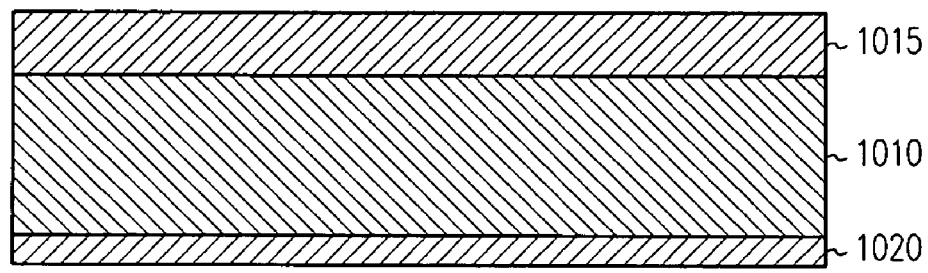
FIGS. 10A, 10B, 10C, 10D, 10E and 10F are block schematic diagrams illustrating formation of a tip according to an example embodiment.

In FIG. 10A, a silicon wafer 1010 has silicon dioxide layers on both sides at 1015 and 1020. In one embodiment, $SiO_2$ layer 1015 is formed on top of wafer 1010 and is approximately 3 um thick. $SiO_2$ layer 1020 is formed on a bottom of the wafer 1010 and is approximately 1 um thick. In one embodiment, plasma enhanced chemical vapor deposition (PECVD) was used to form the oxide layers. Other thicknesses may be used as desired consistent with the formation of the tip.

Figure 10B:
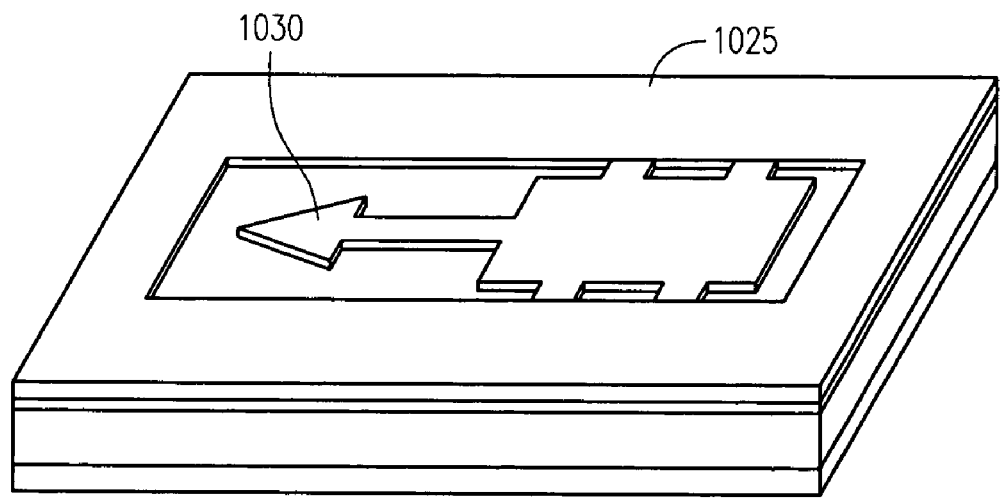

A patterned photoresist 1025 is formed on the top or front of the wafer as shown in perspective view in FIG. 10B. A tip shape is defined in the photoresist as indicated at 1030. In one embodiment, the tip is in the shape of an arrow extending from a support structure, such as a rectangular block. The head of the arrow is a triangular shape coupled to the end of a shaft extending from the support structure. Other shapes of tips may be formed as described below.

Figure 10C:
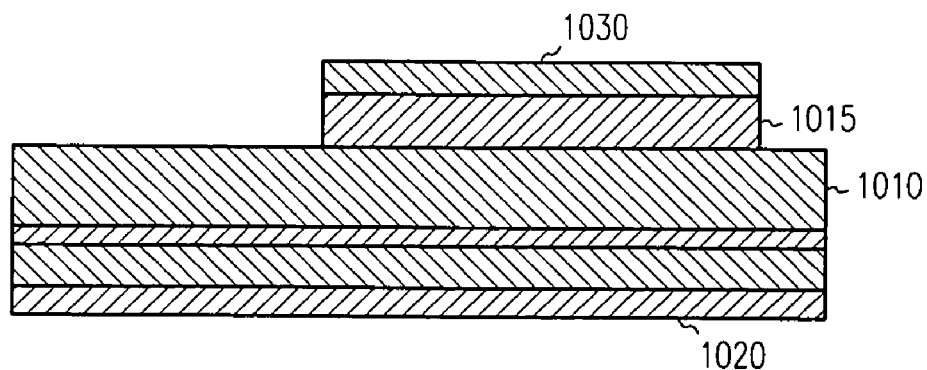
Figure 10D:
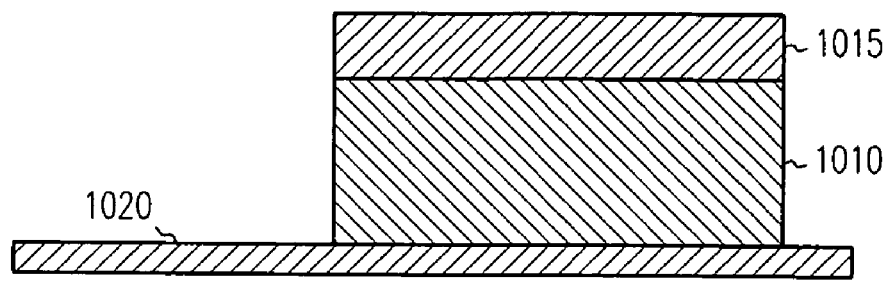
Figure 10E:
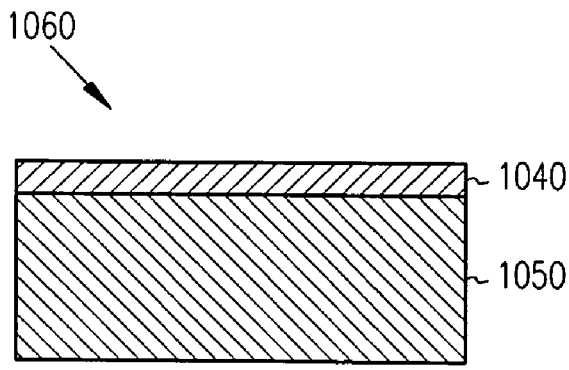

FIG. 10C is a cross section of the wafer 1010 following etching of the oxide, such as by use of $CHF_3/O_2$ plasma. The remaining resist may be removed in an oxygen plasma. FIG. 10D is a cross section of the wafer 1010 following a full wafer etch-through to the lower oxide layer 1020, using a Bosch process, or other process that provides a fairly deep etch with desirable, fairly straight sidewall characteristics. Remaining oxide is then removed, such as by use of HF, and a conductive layer is applied to the top of the tip as seen at 1040 in FIG. 10E. The conductive layer in one embodiment is formed of approximately 20 nm of Cr and 100 nm of Au deposited by use of electron beam evaporation. Other conductors, thicknesses and methods of forming such may be used in various embodiments. Gold is used in one embodiment. The remaining silicon 1050 combined with the conductive layer form an electrospinning tip 1060, which may be removed from the wafer, which in one embodiment is a 4 inch wafer from which multiple tips may be formed. 25 tips may be formed in some embodiments, and cleaved from the wafer.

Figure 10F:
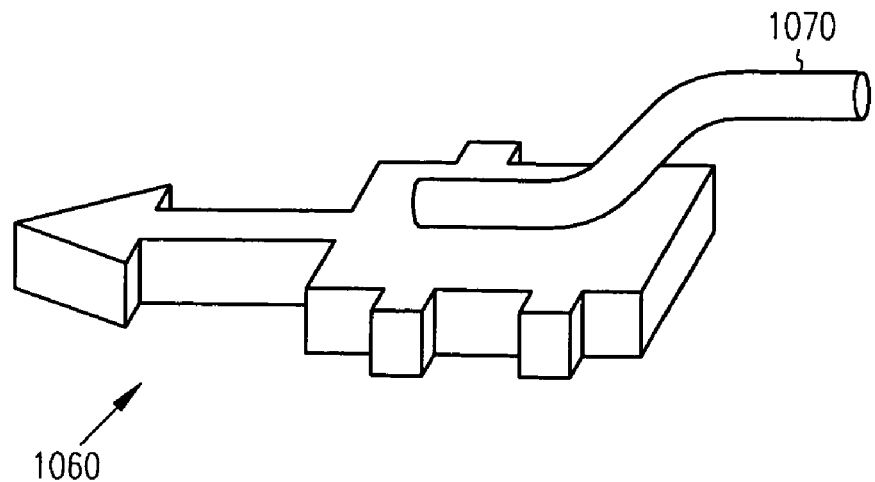

A perspective view of tip 1050 is seen in FIG. 10F, with the addition of a conductive wire 1070 attached to the conductive layer 1040 of tip 1050. In one embodiment, the wire 1070 comprises tungsten. Other conductive materials, such as gold, may also be used for the wire.

Figure 11A:
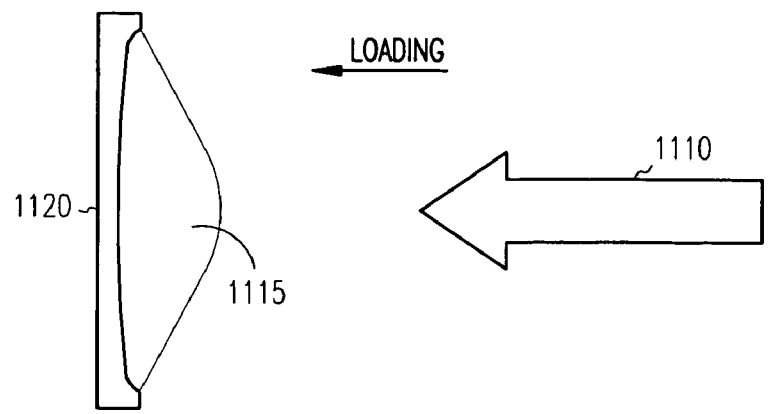
FIGS. 11A, 11B, and 11C are block diagrams illustrating an example nanofibers fabrication process.
Figure 11B:
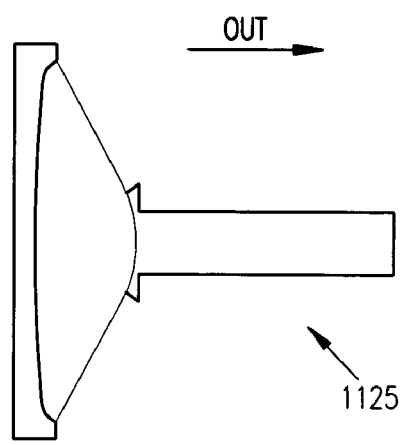
Figure 11C:
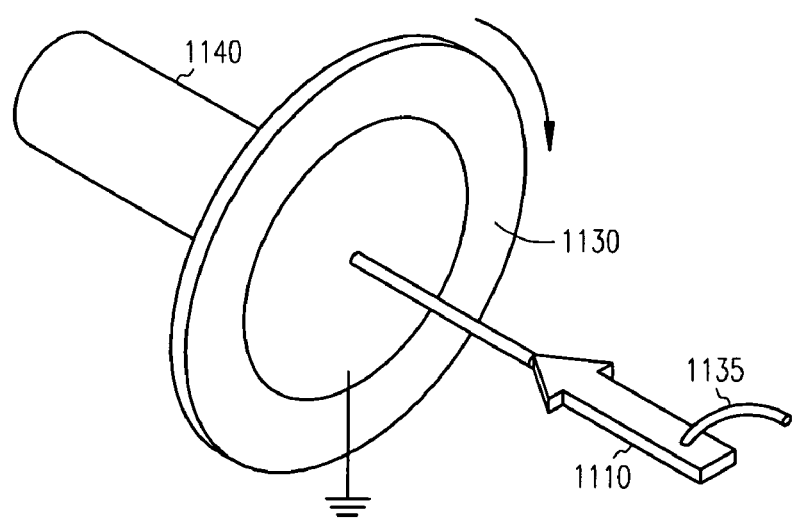

FIGS. 11A, 11B, and 11C are block schematic diagrams illustrating an example nanofibers fabrication process. An arrow tip 1110 is supported on a fixture to facilitate dipping the tip into a polymeric solution 1115 supported by a plate 1120. Plate 1120 may be made of glass or other suitable material that provides a surface to support the solution. Other solutions may be used that provide the ability to form nanowires/nanofibers. FIG. 11B illustrates dipping of the arrow tip 1110 into the solution 1115 generally at 1125. The arrow shape of the tip may help establish a droplet of solution localized on the tip.

In one example embodiment, for ease of observation of formation of a Taylor cone, the tip is placed approximately 2 cm from a rotating counter electrode 1130. The counter electrode is grounded in one embodiment, and a potential of approximately 4000 to 6000V is applied between the tip and the electrode as indicated at 1135 to form the Taylor cone. To minimize the effect of liquid evaporation from the droplet, the nanofiber fabrication process is done within a few seconds after droplet formation. For formation of aligned fibers, the counter electrode 1130 is coupled to a chopper motor 1140 to provide a simple means to control the motion of the tip relative the counter electrode 1130, which in one embodiment comprises a wafer. The velocity of the motor is adjusted to control the rotational velocity of the counter electrode.

In one embodiment, various solutions of PEO may be used. Weight concentrations of 5, 10, 20 and 30% of PEO in a solvent of 50% deionized water and 50% ethanol may be utilized. Other concentrations may also be used, as well as entirely different solutions that are capable of forming wires. For a composite particle deposition, a 50-50 mixture of 20% PEO polymer solution and a fluorescent latex nanosphere suspension may be prepared. A final approximated PEO polymer weight concentration in the prepared polymeric colloidal solutions is approximately 10%. The diameters of the fluorescent latex spheres are approximately 100 and 500 nm in one embodiment. The concentration of the spheres in one embodiment is between $9.0 \times 10^{11}$ and $7.0 \times 10^{11}$ particles per ml respectively. Other size spheres, and other types of spheres and particles may also be used.

Polyaniline (PANI) (48 mg, emeraldine base; Mw approximately 20,000, purchased from Aldrich, Wis., USA) may be dissolved in chloroform (1.5 ml) and doped with 10-camphorsulfonic acid (122 mg). PEO (48 mg, $M_w$ approximately 900,000 purchased from Aldrich) may be added to the chloroform solution and stirred overnight. The concentration of PEO/PANI-HCSA may range from 0.5 to 2.0 wt. %. The amount of PEO mixed with PA may be varied from 10 to 80 wt. % in one embodiment.

In one embodiment, a Taylor cone is established with a potential of 4500 V applied to a 20 ul dropet and the counter electrode. Nanofibers may be generated for approximately 5 to 10 seconds. The length of the nanofiber is controlled by the volume of the droplet loaded on the tip. The length may also be controlled by controlling the potential. Removing the potential at desired times results in removing the Taylor cone, and hence stopping production of the nanofiber at a desired time and distance. Nanofibers are deposited immediately after the polymeric solution is loaded to reduce effects of evaporation. In addition to the arrow shaped tip, triangle-shaped and straight metal wire tips may be employed. It may be more difficult to establish a Taylor cone with some tip shapes.

Diameters of nanofibers deposited from the various solutions may be in the 100 to 200 nm range for the 5% solution, 200-300 nm range for 10%, 300-500 nm for 20% and 500 to 1800 nm range for 30%. The polymer viscosity increases with concentration. The viscosity of a 30% solution is very high. Lower viscosity solutions appear to result in smaller diameter fibers.

Deposition distance may also be varied. In one embodiment, the distance is varied between 0.5 to 1.5 cm with a PEO solution of 10%. The counter electrode is not spun in this embodiment. Changes may be observed in the nanofiber morphology. In the case of a 0.5 cm deposition distance, deposited polymer resembles a membrane. This may be the result of the short transit distance, in which the polymer may arrive at the counter electrode as a wet polymer, allowing them to merge to form larger fibers, or bond together to make a fibrous web. At a distance of 0.75 cm, cylindrical nanofibers may be formed of diameter 200 to 850 nm range. In this case, the nanofibers appear to have partially dried while traveling to the counter electrode. At 1.0 cm distances, thinner nanofibers appear to be created, having average diameters of approximately 153 nm. A 5% solution resulted in nanofibers as small as 45 nm.

In further embodiments, the motion of the tip relative to the counter electrode is used to control nanofiber orientation. A linear velocity of approximately less than approximately 168 cm per second produced slightly bent nanofibers, instead of fairly straight nanofibers. Higher linear velocities produced fairly straight nanofibers for a 10% solution. In further embodiments, the linear velocity used to produce substantially straight nanofibers may depend at least on the potential and solution used.

Composite materials may also be deposited by electrospraying a mixture of PEO and colloidal particles, such as the fluorescent nanospheres with 100 nm and 500 nm diameters. In one embodiment, such colloidal suspensions were spun with a relative tip to counter electrode velocity sufficient to provide straightened nanofibers with a 30 degree variation along the rotational direction, rather than a random orientation. Latex nanospheres may be confined in the nanofibers and are self assembled along the nanofibers. The diameter of the nanofibers may be in the 100 to 300 nm range, or other ranges depending on distance and percent solutions utilized. In one embodiment, a line density of nanospheres confined in the nanofibers is approximately 0.75 particles per um for 100 nm nanospheres, and approximately 0.68 particles per um for 500 nm nanospheres.

In one embodiment, the tips may be reused after surface cleaning. A wide range of polymeric material, such as highly viscous polymeric solutions can be electrospun from the tip. The short deposition distance as compared to syringe based electrospinning provides for easy control of the orientation of the nanofibers. The tips also provide the capability of electrospinning of colloidal suspensions mixed with a polymer solution to fabricate nanofibers composite materials. In addition to the formation of nanofibers, scanning tips may be used to electrospray liquids, chemicals and for particulate deposition on a surface.

In still further embodiments, a solution of poly(methyl methacrylate) (PMMA) is used for fiber formation. 4 wt. % and 5.5 wt. % PMMA solutions may be prepared by dissolving 67.2 mg and 92.4 mg of PMMA (Mw 495,000) in 2 ml of anisole (phenyl methyl ether), respectively. A pipette or other type of applicator may be utilized to provide 30 ul of solution on the silicon tip. A voltage of 4000 to 7000 V may be applied between the tip and counter electrode to establish the Taylor cone and extract a liquid jet from its apex. By rotating a target substrate on the counter electrode at approximately 500 rpm, the relative scanned motion of the counter electrode to the electrospinning source (the tip) controls orientation of the deposited PMMA nanofibers on the surface of the target substrate. A distance of approximately 1.5 cm between tip and target substrate was adequate to produce desired nanofibers.

Target substrates may include many different materials, such as silicon, aluminum, thin film aluminum on silicon, and non-conducting substrates, such as silicon dioxide, silicon nitride, glass slides, cover slips and others. Such non-conductive substrates are mounted on the counter electrode in the path of the extracted liquid jet.

With highly volatile solvents in the solution used to form a Taylor cone may be stable only for several seconds prior to evaporation. A side effect of such volatile solvents appears to be the formation of more than one polymer liquid jet being extracted from a silicon tip per deposition cycle. This may lead to fibers of different sizes being deposited on the same substrate. When multiple polymer jets are extracted, the diameters of such jets may have very small diameters. Reducing the size of the microfabricated tip may also consistently create nanofibers with very small diameters.

In one embodiment, using the 4 wt. % solution of PMMA in anisole, fibers were produced having an average diameter of approximately 85.2 nm. Fibers deposited using 4 wt. % solution of PMMA range from 81.4 to 326.5 nm with an average of 190 nm. Fibers deposited using 5.5 wt. % solution of PMMA range from 88.5 to 346 nm with an average of 206 nm.

The smallest diameter fibers extracted from the solutions were deposited when more than one polymer jet was extracted from the silicon tip. The multiple jets produced fibers of various sizes, instead of a single jet producing fibers of approximately the same size.

Figure 12A:
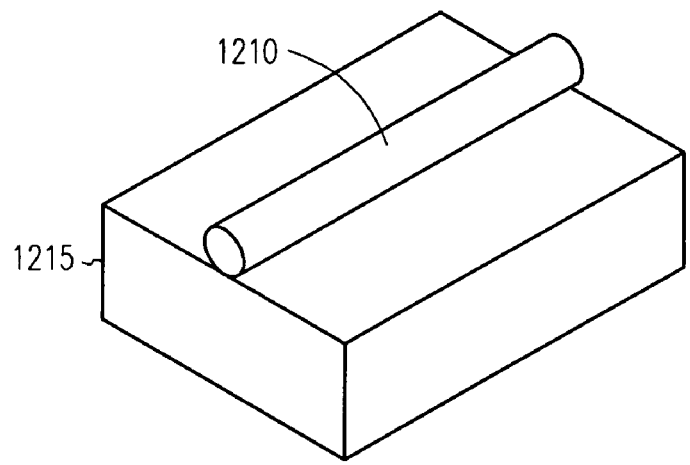
FIGS. 12A, 12B and 12C are block diagrams illustrating formation of a nanostructure according to an example embodiment.
Figure 12B:
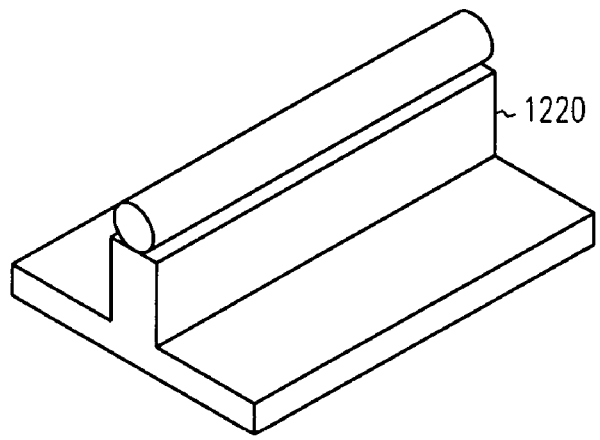
Figure 12C:
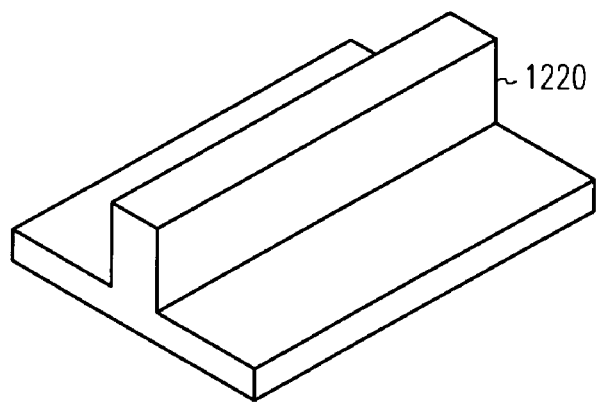

FIGS. 12A, 12B and 12C are block diagrams illustrating formation of a nanostructure according to an example embodiment. A PMMA nanofiber or mask 1210 is deposited on a substrate 1215, such as silicon. In one embodiment, the fiber 1210 is heated to 110 C on a hot plate for 10 minutes to remove any remaining solvent. Other methods may be used to remove remaining solvent if desired. The substrate was then cooled and placed in a reactive ion etcher, where a $CF_4$ plasma chemistry was run for 1 minute to etch the underlying silicon substrate as seen in FIG. 12B, leaving a ridge 1220 of silicon beneath the fiber 1210. Etch selectivity of the PMMA mask 1210 to silicon substrate is 1.3 to 1 in one embodiment. The remaining PMMA mask 1210 may be removed in an oxygen plasma, leaving behind the ridge 1220 in FIG. 12C. In one embodiment, the ridge is a silicon structure with a width and height of 86.5 and 71.5 nm, respectively. Small variations in the width of the structure may be similar to those seen in structures defined by PMMA that were patterned by electron beam lithography. In further embodiments, different size structures may be created using wider or narrower nanofiber masks, along with variations of etching. Multiple nanofibers of various dimensions and orientations may be deposited, and even nanofiber meshes and random patterns may be used to crease a wide variety of etch masks. An x,y,z stepper may be used for moving the target substrate in desired manners during deposition of the nanofibers to provide even greater flexibility in mask pattern creation.

In another example embodiment of a nanostructure, a rounded channel has an elliptical cross section with major and minor radii of less than 100 nm. In one embodiment, a heat depolymerizable polycarbonate (HDPC) nanofiber is electrospun from a tip onto a substrate. A capping layer is formed on top of the substrate, and encapsulates the nanofiber. In one embodiment, the capping layer is silicon dioxide, selected for biocompatibility reasons.

The HDPC in one embodiment is a 20 wt. % solution of HDPC ($M_w$=100,000) in chlorobenzene. It is dispensed onto the silicon tip, and potential of approximately 6000 to 8000 volts is applied to form a Taylor cone and corresponding polymer jet. Target substrates include but are not limited to silicon, thin film silicon dioxide on silicon and glass. The substrate is mounted on the target electrode which is located approximately 1.5 cm from the source tip.

A photoresist is spun on the capping layer, and removed at two ends of the nanofiber by use of a photo mask or mechanically removed by wiping with a swab, wetted with acetone. The capping layer is then dry etched down to the substrate in a CHF$_3$/O$_2$ plasma chemistry to provide reservoirs for accessing the nanofiber. The remaining photoresist is removed in either an oxygen plasma or by using a solvent such as acetone. The substrate is then heated at 325° C. for approximately 24 hours or other suitable time to allow by-products of nanofiber polymer decomposition to diffuse out, forming a nanochannel from the depolymerized nanofiber, which effectively acts as a sacrificial layer.

Conventional silicon processing techniques utilize temperatures above the glass transition temperature, $T_g$=120° C., of HDPC. Processing the fibers above their $T_g$ may cause the fibers to deform from their cylindrical shape, leading to corners in the resulting channels. Alternative, lower temperature processes include the use of silicon dioxide capping layer formed by evaporation over the fibers. Even though this does not require direct heating of the substrate, radiative heading from the silicon dioxide source may cause the channels to show similar heat induced characteristics, such as being flat on the bottom side that contacts the substrate.

Other materials with lower melting temperatures may also be evaporated or other wise formed on the substrate for use as a capping layer. Aluminum may also be used, resulting in a rounder channel, but still possibly slightly flat on the bottom. Aluminum may not be suitable for use where optical inspections of material in the channels is required, such as applications involving the use of fluorescently labeled biomaterials.

A further alternative capping layer uses spin-on glass. Use of this material results in a fairly elliptical shaped channel, with example major and minor diameters of 168 and 98 nm respectively. The spin-on glass may be dispensed on the surface of the substrate using a pipette, or other mechanism. The substrate is then spun at 1500 rpm for 60 seconds, baked on a hot plate at 70° C. for 5 minutes, then ramped to 250° C. in 15 minutes. This may result in substantially elliptical channels with minor diameters perpendicular to the surface of the substrate. With such elliptical shapes, the channel provides simple boundary conditions for finite element simulations of flow fields at a 100 nm length scale. Also, with no corners or acute angles, the channels may be useful for high resolution separation of biomaterials.

A scanned electrospinning technique has been described that may be used to form a variety of one dimensional nanostructures. It may enable rapid fabrication of oriented polymeric nanowires/nanofibers as well as their integration with lithographically defined surfaces. It also provides new opportunities for the manufacture of nanowires devices, including nanochannels of elliptical shape.

The invention claimed is:

1. A method of forming nanofibers, the method comprising:
positioning a target substrate and counter electrode a desired distance from a microfluidic emitter having an emitter tip;
providing a polymer to the microfluidic emitter tip;
applying a potential between the microfluidic emitter tip and the target substrate to create nanofibers on the target substrate and;
creating lateral movement between the target substrate and the microfluidic emitter.

2. The method of claim 1 and further comprising using an x-y motion stage to provide lateral movement.

3. The method of claim 1 wherein the lateral movement is provided by rotating the target substrate to obtain a surface velocity of up to approximately 168 cm/s with respect to the microfluidic emitter tip.

4. The method of claim 1 wherein the lateral movement is provided by rotating the target substrate between 40 and 800 RPM.

5. The method of claim 1 wherein the desired distance is between approximately 0.5 cm to 2.0 cm flow of the polymer.

6. The method of claim 1 wherein the applied potential is between 2000 V and 8500 V.

7. The method of claim 1 wherein the polymer is provided to the tip by dipping the tip in the polymer.

8. The method of claim 1 wherein the polymer is provided to the tip by an applicator.

9. The method of claim 1 wherein the polymer comprises a colloidal suspension.

10. The method of claim 1 wherein the nanofibers are less than 100 nm in diameter.

11. A method of forming nanofibers, the method comprising:
positioning a target substrate and counter electrode a desired distance from a microfluidic emitter having an emitter tip;
providing a polymer to the microfluidic emitter tip; and
applying a potential between the microfluidic emitter tip and the target substrate to create nanofibers on the target substrate, wherein the polymer comprises a colloidal suspension including nanospheres.

12. A method of forming nanofibers, the method comprising:
forming features on a target substrate;
positioning the target substrate and metal counter electrode a desired distance from a microfluidic emitter;
providing a polymer to the microfluidic emitter; and
applying a potential between the microfluidic emitter and the target substrate to create nanofibers spanning the features on the target substrate.

13. The method of claim 12 wherein the feature comprises a trench.

14. The method of claim 13 wherein the trench is between approximately 3 um to 5 um in width, and approximately 2 um in depth.

15. The method of claim 12 and further comprising providing lateral movement of the target substrate relative to the microfluidic emitter.

16. A method of forming nanofibers, the method comprising:
positioning a target substrate and aluminum counter electrode a desired distance of between 0.5 and 2.0 cm from a microfluidic emitter tip;
rotating the target substrate with respect to the microfluidic emitter tip;
pumping a polymer through the microfluidic emitter; and
applying a potential of between 2000 V and 8500 V between the microfluidic emitter tip and the target substrate to create nanofibers that are approximately 100 nm in diameter on the target substrate.

17. The method of claim 16 wherein the target substrate is rotated to obtain a surface velocity with respect to the microfluidic emitter that results in substantially straight nanofibers being formed on the target substrate.

18. A method of forming nanofibers, the method comprising:
positioning a target substrate a desired distance from a source;
pumping a polymer through the source; and
moving the source to create nanofibers having a desired orientation on the target substrate.

* * * * *